United States Patent
Jou et al.

(10) Patent No.: US 8,539,388 B2
(45) Date of Patent: Sep. 17, 2013

(54) METHOD AND APPARATUS FOR LOW POWER SEMICONDUCTOR CHIP LAYOUT AND LOW POWER SEMICONDUCTOR CHIP

(75) Inventors: Chewn-Pu Jou, Hsinchu (TW); Ming-Tsun Lin, Taichung (TW); Fu-Lung Hsueh, Cranbury, NJ (US); Shauh-Teh Juang, Jhubei (TW)

(73) Assignee: Taiwan Semiconductor Manufacturing Company, Ltd. (TW)

( * ) Notice: Subject to any disclaimer, the term of this patent is extended or adjusted under 35 U.S.C. 154(b) by 189 days.

(21) Appl. No.: 12/852,664

(22) Filed: Aug. 9, 2010

(65) Prior Publication Data

US 2012/0017192 A1 Jan. 19, 2012

Related U.S. Application Data

(60) Provisional application No. 61/364,278, filed on Jul. 14, 2010.

(51) Int. Cl.
*G06F 17/50* (2006.01)
(52) U.S. Cl.
USPC ............. 716/50; 716/100; 716/106; 716/122; 716/132; 716/133
(58) Field of Classification Search
USPC ..... 716/50–55, 100–106, 109–111, 119–122, 716/132–133
See application file for complete search history.

(56) References Cited

U.S. PATENT DOCUMENTS

| | | | | |
|---|---|---|---|---|
| 5,426,591 A | * | 6/1995 | Ginetti et al. ................. | 716/104 |
| 5,612,893 A | * | 3/1997 | Hao et al. ........................ | 716/55 |
| 5,764,525 A | * | 6/1998 | Mahmood et al. ............. | 716/104 |
| 6,209,122 B1 | * | 3/2001 | Jyu et al. ........................ | 716/113 |
| 6,269,468 B1 | * | 7/2001 | Dean et al. ..................... | 716/108 |
| 6,493,854 B1 | * | 12/2002 | Chowdhury et al. ......... | 716/114 |
| 7,363,607 B2 | * | 4/2008 | Birch et al. .................... | 716/113 |

(Continued)

FOREIGN PATENT DOCUMENTS

CN 1505152 6/2004

OTHER PUBLICATIONS

Cong, Jason et al., "Interconnect Performance Estimation Models for Design Planning", Jun. 2001, IEEE Transactions on Computer-Aided Design of Integrated Circuits and Systems, vol. 20, No. 6, pp. 739-752.*

(Continued)

*Primary Examiner* — Paul Dinh
(74) *Attorney, Agent, or Firm* — Lowe Hauptman & Ham, LLP (57) ABSTRACT

A layout system is described comprising a layout unit configured to layout cells in a mask design for a semiconductor chip based on library cells for a specified process node; a non-critical path determination unit configured to determine a non-critical path in the semiconductor chip; a cell determination unit configured to determine a group of cells in the mask design that form a part of the non-critical path and determine the corresponding library cell for at least one of the group of cells; a library cell modifying unit configured to modify one or more corresponding library cells to form a corresponding modified library cell; and a cell replacement unit configured to replace a library cell in the group of cells in the mask design that form a part of the non-critical path with the corresponding modified library cell.

20 Claims, 7 Drawing Sheets

(56) References Cited

U.S. PATENT DOCUMENTS

| | | | |
|---|---|---|---|
| 7,617,470 B1* | 11/2009 | Dehon et al. | 716/116 |
| 8,010,928 B1* | 8/2011 | Birch et al. | 716/126 |
| 8,024,675 B1* | 9/2011 | Gupta et al. | 716/54 |
| 2001/0029600 A1* | 10/2001 | Lee et al. | 716/17 |
| 2001/0034873 A1* | 10/2001 | Arsintescu | 716/8 |
| 2002/0030513 A1* | 3/2002 | Toyoshima | 326/112 |
| 2002/0069396 A1* | 6/2002 | Bhattacharya et al. | 716/7 |
| 2003/0204822 A1* | 10/2003 | Whitaker et al. | 716/2 |
| 2004/0237061 A1* | 11/2004 | Kahng et al. | 716/19 |
| 2005/0132306 A1* | 6/2005 | Smith et al. | 716/1 |
| 2005/0138588 A1* | 6/2005 | Frenkil | 716/6 |
| 2007/0074146 A1* | 3/2007 | Tanaka et al. | 716/21 |
| 2008/0040698 A1* | 2/2008 | Ferrari et al. | 716/6 |
| 2008/0104552 A1* | 5/2008 | Yamada | 716/2 |
| 2008/0216040 A1* | 9/2008 | Furnish et al. | 716/10 |
| 2009/0037852 A1* | 2/2009 | Kobayashi et al. | 716/2 |
| 2009/0037854 A1* | 2/2009 | Bittlestone et al. | 716/4 |
| 2009/0164963 A1* | 6/2009 | Zarkesh-Ha et al. | 716/12 |
| 2009/0194823 A1* | 8/2009 | Maeda | 257/392 |
| 2009/0254874 A1* | 10/2009 | Bose | 716/6 |
| 2009/0293033 A1* | 11/2009 | Ito | 716/6 |
| 2010/0023917 A1* | 1/2010 | Kahng et al. | 716/19 |
| 2010/0169846 A1* | 7/2010 | Gupta et al. | 716/2 |
| 2010/0169847 A1* | 7/2010 | Gupta et al. | 716/2 |
| 2010/0196803 A1* | 8/2010 | Lu et al. | 430/5 |

OTHER PUBLICATIONS

Office Action dated Nov. 5, 2012 from corresponding application No. CN 201110165758.7.

* cited by examiner

Fig. 7

METHOD AND APPARATUS FOR LOW POWER SEMICONDUCTOR CHIP LAYOUT AND LOW POWER SEMICONDUCTOR CHIP

BACKGROUND

The electronics industry has an ever growing need for increased data processing performance with reduced power consumption. One way that this reduced power consumption is delivered is by decreasing the size of the features that make up a Semiconductor Chip by a process known as "scaling." As the dimensions of Semiconductor Chips become smaller, however, the cost of scaling increases. Therefore, new methods for improving the data processing performance to power consumption ratio are desired.

DESCRIPTION OF THE DRAWINGS

One or more embodiments are illustrated by way of example, and not by limitation, in the figures of the accompanying drawings, wherein elements having the same reference numeral designations represent like elements throughout and wherein.

DETAILED DESCRIPTION

Figure 1:
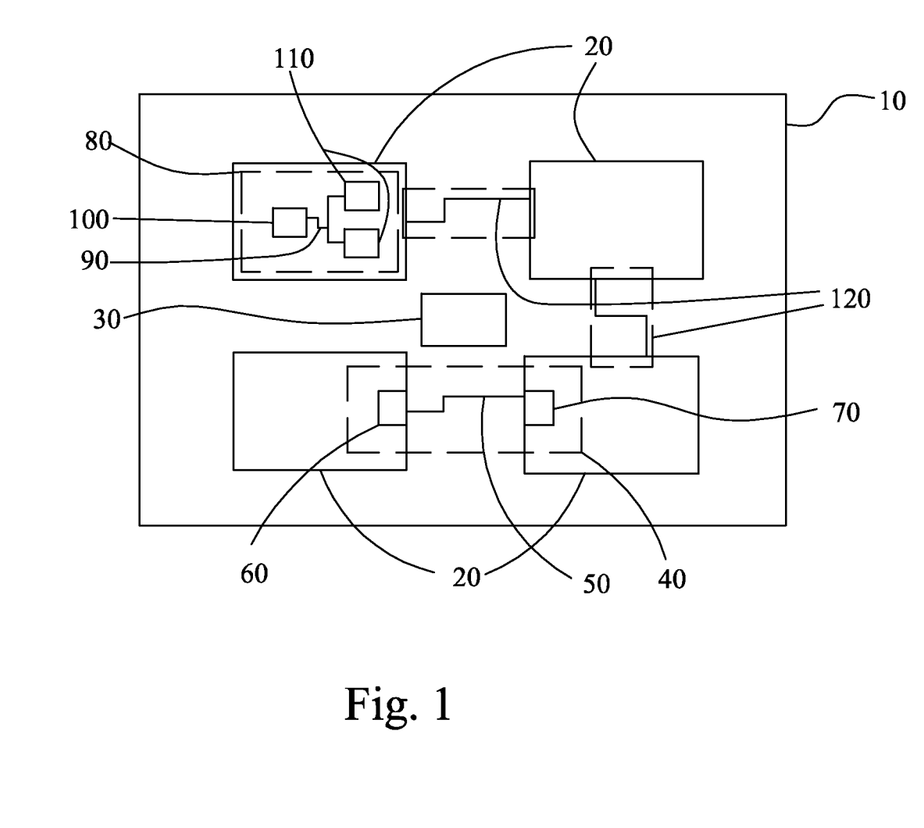
FIG. 1 is a high-level functional schematic diagram of an exemplary semiconductor chip.

FIG. 1 depicts a semiconductor chip 10. The semiconductor chip 10 includes various functional circuit blocks 20 such as, but not limited to, memory blocks, arithmetic and logic units, etc. During operation, the various functional circuit blocks 20 perform data processing and logic operations. These data processing and logic operations are usually coordinated by one or more clock circuits 30. This application is not limited to circuits coordinated by one or more clocks, but is also applicable to so-called "asynchronous logic" lacking a centralized clock circuit.

During the above described data processing and logic operations, particular paths in the circuit limit the circuit operating performance, i.e., the speed of operation of the circuit. These paths are referred to as critical paths. Signal path 40, that connects two functional circuit blocks 20, is a critical path because the critical path wiring 50 between the two functional circuit blocks 20 is long enough to limit the processing speed of the semiconductor chip 10. More specifically, the longer the critical path wiring 50, the larger the capacitance of the wiring. Therefore, because of the time required to supply sufficient charge to charge critical path wiring 50, a logic state change on critical path wiring 50 performed by critical path driving circuit 60 occurs over a longer time period than if the critical path wiring 50 needed to be charged a lesser amount. Moreover, in some embodiments, the critical path driver 60 also charges the capacitance of critical path input 70.

If circuits within any of the functional blocks 20 require the value at critical path input 70 before those circuits perform a next processing step, the time taken to charge the critical path wiring 50 and the capacitance of critical path input 70 limits the total processing speed of the semiconductor chip 10.

The above issues regarding critical paths are also found within a single functional circuit block 20 as local critical paths. Unlike critical path 40, in some embodiments, the wiring capacitance is a less significant issue and the input capacitance of the next stage becomes the dominant factor. For example, a local critical path 80 having a local critical path wiring 90, a local critical path driving circuit 100 and local critical path inputs 110 forms a critical path. In some embodiments, although the capacitance of local critical path wiring 90 is not high, the total input capacitance of local critical path inputs 110 is high enough to make this particular path a critical path. In particular, this is true if the local critical path driving circuit 100 drives a large number of critical path inputs 110. The time taken to charge the local critical path wiring 90 and the capacitance of local critical path inputs 110, therefore, also limit the total processing speed. The semiconductor chip is laid out to attempt to minimize the number of critical paths, and to reduce delay caused by critical paths. However, at least one critical path is a limit on the speed that semiconductor chip 10 processes data.

Other than the critical paths in the semiconductor chip 10, there are non-critical paths 120. The non-critical paths are non-critical because 1) the logic values processed and transmitted are not used by subsequent circuits in a manner that conflicts with signals on other paths; or 2) the path is short and has few inputs to drive and is, therefore, inherently fast compared to other paths with which the path conflicts.

The critical and non-critical paths 40, 80 and 120 in the semiconductor chip 10 dissipate power as a result of, and in at least some embodiments during, switching from one state to another. To change the state of a path, current flows through the driver circuits driving the path from power supply wiring to charge the wiring and input capacitances on the path. This current flows until the wiring and input capacitances are charged to a voltage equal to a voltage on the power supply wiring. As the current flows through the path, the driver dissipates power equal to the product of the current flowing and voltage drop across the driver. The energy dissipated each time a path is switched to a different state is thus proportional to the voltage on the power supply wiring and to the capacitance of the wiring and inputs. The power dissipated by a path per unit time, is determined by the product of the energy dissipated each time a path is switched and the number of times the path switches per unit time. Therefore, reduction in the voltage on the power supply wiring (the operating voltage of the semiconductor chip 10), reduction in the number of times the path switches per unit time (usually governed by the frequency of clock 30) or reduction in the capacitance of the wiring and inputs, causes a reduction of the power consumption of semiconductor chip 10.

Reducing the frequency of clock 30 also reduces the rate at which the semiconductor chip 10 processes data. Further, the minimum operating voltage is usually set by the structure of the switching devices forming the semiconductor chip 10. Moreover, reducing the operating voltage also reduces the speed of the devices forming semiconductor chip 10. Therefore, reducing the capacitance of paths within the semiconductor chip 10 is an effective way to reduce the power consumption without reducing processing speed. Because the capacitance of both the wiring and the inputs scales with the area of these features in the semiconductor chip 10, making these features smaller reduces the power consumption.

Figure 2:
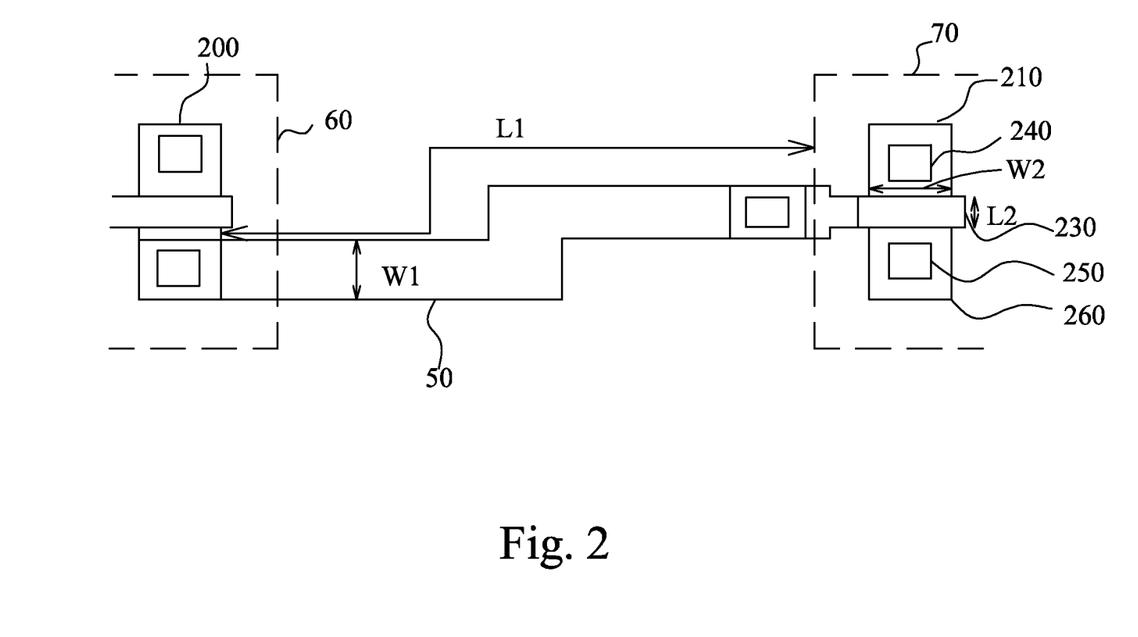
FIG. 2 is a high-level functional schematic diagram of an example of a semiconductor device used to form a critical path driving circuit.

FIG. 2 depicts an example of a first semiconductor device 200 used to form the critical path driving circuit 60. The first semiconductor device 200 is connected to a second example semiconductor device 210 that forms a portion of the critical path input 70 via wiring 50. Second semiconductor device 210 comprises a gate 230, a source contact 240, a drain contact 250 and a doped region 260. In operation, a voltage on the gate 230 controls the flow of current through the doped region 260 and, therefore, the current flow between the source contact 240 and drain contact 250. First semiconductor device 200 comprises similar features.

The wiring 50 forms a capacitor with the substrate of the semiconductor and, the capacitance is proportional to the width W1 and length L1 of the wiring 50. The input capacitance of the critical path input 70 is proportional to the width W2 and length L2 of the gate 230 of semiconductor device 210.

Semiconductor chips like semiconductor chip 10 are laid out using sophisticated computer aided design (CAD) systems. In some embodiments, those CAD systems receive a circuit schematic or an algorithm written in a computer language such as VHDL as input. The CAD system then uses complex procedures to convert the circuit schematic or algorithm to a mask layout that defines masks for each layer of a semiconductor process. The mask layers define the sizes of the various features that produce the semiconductor devices such as semiconductor devices 200, 210 and wiring 220. In particular, the sizes W1, W2, L1 and L2 are defined by these masks.

To produce the mask layers, the CAD system relies on libraries of "cells." These cells are predefined patterns for, for example, individual transistors and whole functional circuit blocks.

Each cell is designed for a specific process node. The process node defines the smallest length feature definable in the mask set produced by the library, and therefore, the smallest length feature in the semiconductor chip produced by that mask set. Each standard cell in a library is extensively tested, both in simulations and by fabricating real semiconductor chips to verify that the standard cell performs the task for which the standard cell is designed. The cell performs the task without error, even at the margins of expected errors in the processes used to fabricate the standard cell, as well as the margins for any errors in supplying the cell with power and signal(s). Standard cells meeting the above requirements are usable to define parts of circuits, e.g., complex circuits, in the knowledge that the circuit will function properly without the need for extensive test and redesign.

In order to avoid issues in production of a semiconductor chip, the standard cells in a library for a particular node do not include features that are as small as the node for which they are designed. The minimum feature size in the library is slightly larger than the process node size. Thus, for example, in some embodiments, the 180 nm node library has a minimum feature size of 220 nm. The 180 nm library thus provides a 40 nm margin for the process.

Once completed and tested, the standard cell libraries for a particular node are valuable, allowing numerous different semiconductor chips to be designed and built with limited testing because functional units 20 produced using the standard library function with identical performance regardless of the location on the semiconductor chip 10 on which they are placed, and no matter to which other functional blocks 20 they are connected. After a cell library is complete, modification of the libraries is not allowed because of the possibility that the modified libraries will produce chip designs that do not work or worse, are unreliable.

Figure 3:
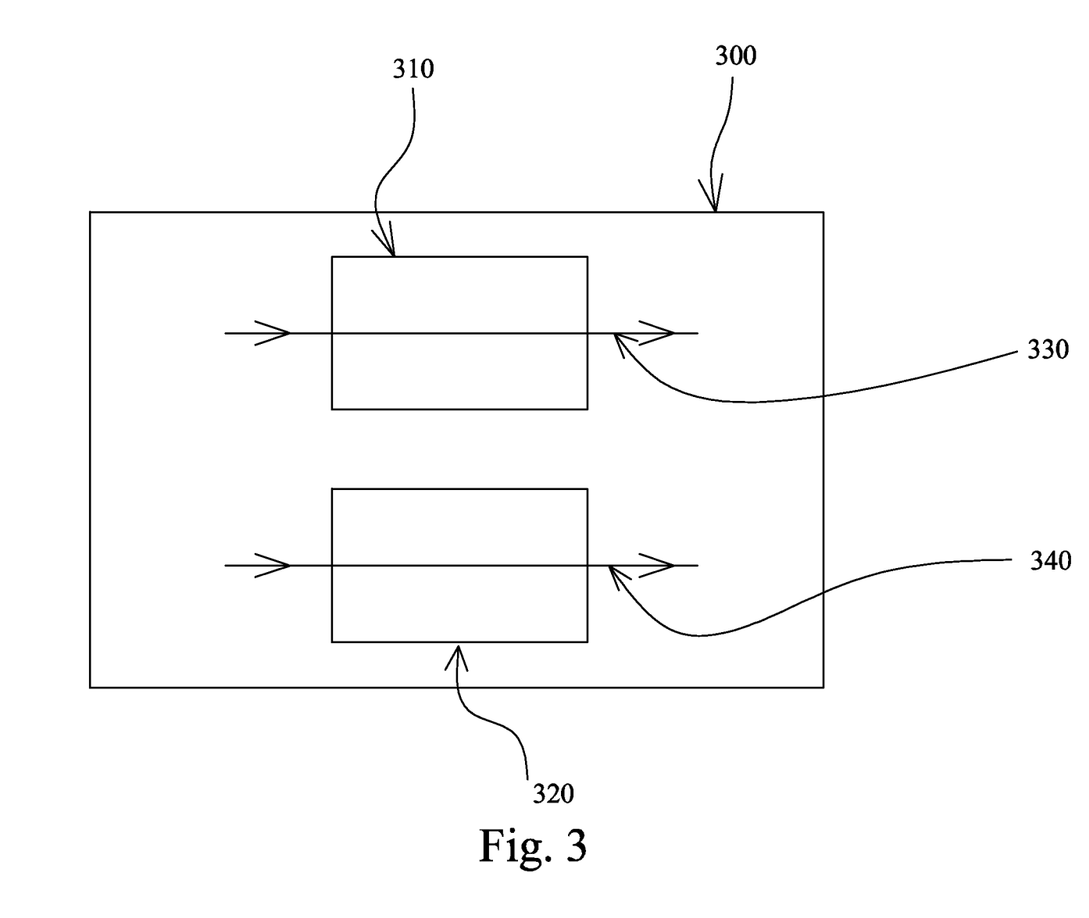
FIG. 3 is a high-level functional schematic diagram of an exemplary semiconductor chip with critical and non-critical paths.

Although designing using the standard libraries produces chip designs that function without error, the designs are not necessarily the most energy efficient. FIG. 3 depicts a semiconductor chip 300 with two identical functional blocks 310 and 320. Functional block 310 is in critical path 330 whereas functional block 320 is on non-critical path 340. The speed at which the semiconductor chip 300 operates is set by critical path 330. This means that the standard library cells forming functional block 320 and, in particular, those cells on non-critical path 340 function faster than needed and thus dissipate more power than necessary.

Having established that functional block 320 is on non-critical path 340 functional block 320 may be modified to operate more slowly and dissipate less power. This is achievable by reducing the feature sizes of wiring and gates of devices in the functional block 320. Reducing the gate length of these gates like L2 (FIG. 2) is not an easy option, because reducing L2 changes the device characteristics in drastic and unpredictable ways. Further, the gate length is usually the minimum feature in any mask layout therefore reducing L2 may make processing difficult. Reducing the gate widths, however, for example W2 of gate 230 of semiconductor device 210, is possible. Further, reducing wiring widths, for example, W1 of wiring 50 (FIG. 2), is also possible.

Reducing gate and/or wiring widths has the effect of reducing the capacitance of a non-critical path input and, therefore, the power that a non-critical path driver requires to drive the input. A disadvantage, however, is that reducing gate width of a semiconductor device also reduces the ability of the semiconductor device with reduced gate width to drive wiring or other input. This is because if the gate width is reduced the channel width of the device is reduced and therefore, the on resistance of the semiconductor device rises. Because the device is on a non-critical path, the reduced driving ability and, therefore, reduced speed of that path, to the extent that the path remains a non-critical path, does not have significant impact to the overall performance.

Reducing gate widths has a second beneficial effect with regard to power consumption of semiconductor chip 10. Semiconductor devices in an "off state," i.e., a state in which current is prevented from flowing between a source and a drain by the gate voltage, continue to leak a small amount of current. Given the large number of transistors on a semiconductor chip, the small leakage current per device becomes a large leakage current in total. As the process node becomes smaller, the leakage per device increases relative to the "on state" current. Therefore, an increasing proportion of wasted power is due to the leakage. The leakage per device is proportional to the gate width W2. Therefore, reducing the gate width of a portion of the devices in semiconductor chip 10 has an additional advantage of reducing the overall leakage and power dissipated by the semiconductor chip 10.

One or more embodiments describe an automated method and system to advantageously perform layout of non-critical paths in a manner that reduces the power consumed by a semiconductor chip.

In view of the above, a method and system is disclosed for designing reduced power consumption semiconductor chips in at least some embodiments. In at least some further embodiments, a semiconductor chip layout is disclosed for reduced power consumption of a particular design.

In some embodiments, the system and method are implemented on a general purpose computer such as a personal computer, workstation, mainframe, or cluster. In some embodiments, the instructions for implementing the system or method are stored on a computer readable medium such as a disk drive, compact disk, flash drive or another computer readable medium currently available or developed in the future that is capable of storing data for an indefinite period of time. In at least one embodiment, the computer readable medium is accessed by the general purpose computer allowing the general purpose computer to read the instructions and implement the system or execute the method.

In at least one embodiment, the system or method is implemented by dedicated hardware such as application specific integrated circuits (ASIC), field programmable gate arrays (FPGA), discrete components or the like. In some other embodiments, the system or method is implemented by a combination of a general purpose computer or computers with dedicated hardware.

Figure 4:
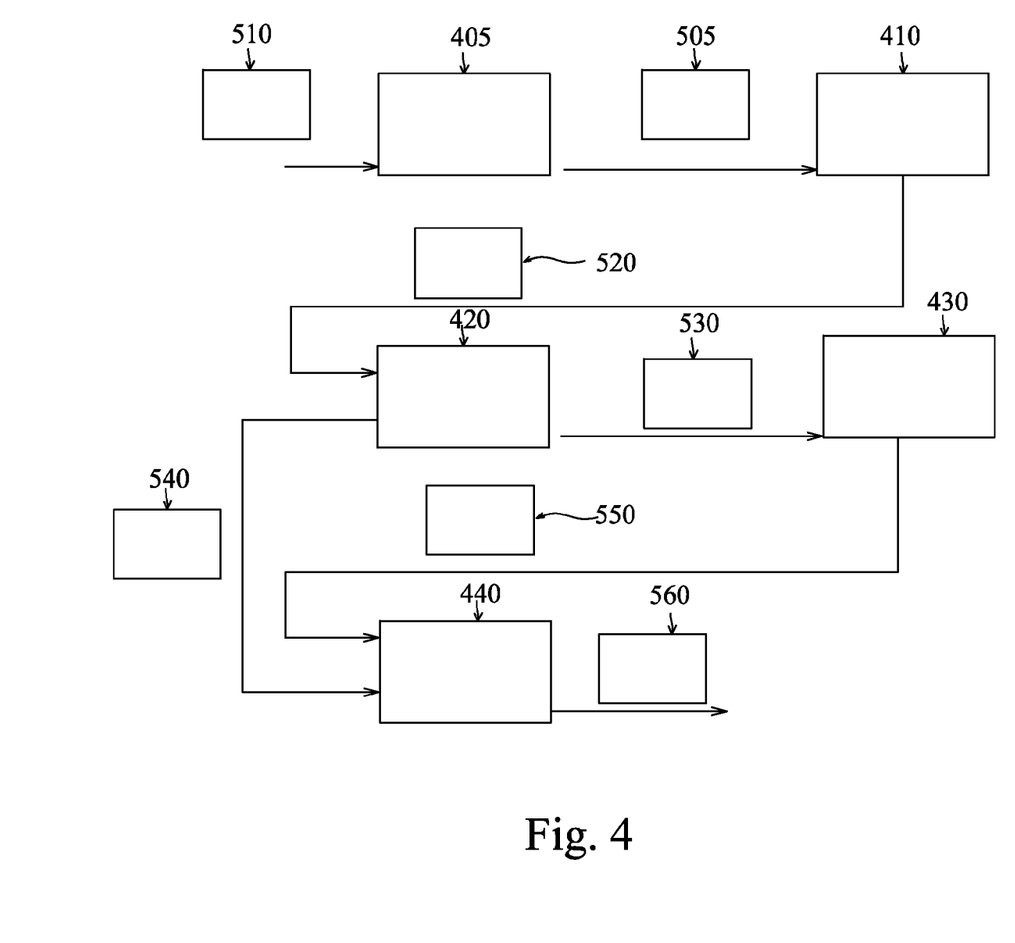
FIG. 4 is a high-level functional block diagram of a system for laying out a low power semiconductor chip according to an embodiment.

FIG. 4 depicts an embodiment of a system 400 for designing reduced power consumption semiconductor chips.

In some embodiments, a layout unit 405 lays out a layout 505 of a semiconductor chip, e.g., semiconductor chip 10 (FIG. 1). In some embodiments, the layout unit 405 receives a schematic design as an input 510, while in other embodiments, the input is an algorithm written in a language such as but not limited to VHDL. In still some other embodiments, the non-critical path determination unit 410 receives as an input any other means for describing the circuit or function of the semiconductor chip currently known or developed in the future.

The layout unit 405 transmits the layout 505 to a non-critical path determination unit 410. The non-critical path determination unit 410 determines a list of the non-critical paths in the design 520, based on the layout 505 and the input 510.

After the non-critical path determination unit 410 determines a list of non-critical paths in the design 520, the list of non-critical paths in the design 520 is transferred to a cell determination unit 420. The cell determination unit 420 determines the list of cells in the design that implement the non-critical paths 530. Further, the cell determination unit 420 compiles a list of library cells 540 used to implement those cells implementing non-critical paths. In some embodiments, all of the library cells identified are included on the list. In other embodiments, only a portion of the library cells identified are included on the list. In some embodiments, the library cells included in the list of library cells 540 are selected based on complexity with more complex cells being excluded; in other embodiments, the library cells included in the list of library cells 540 are selected based on the function of the library cell.

Figure 5A:
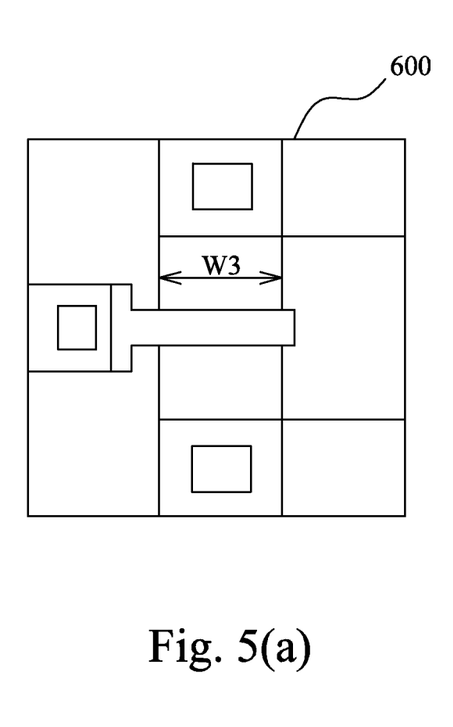
FIGS. 5(a) and 5(b) are depictions of exemplary library cells for a semiconductor device.
Figure 5B:
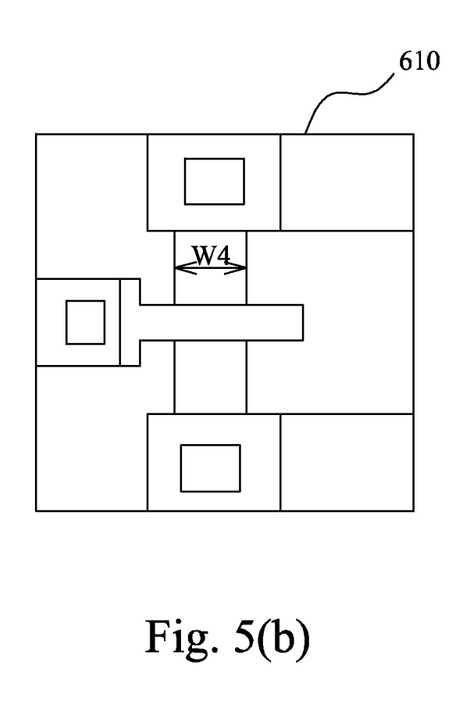

Next, the list of library cells 540 selected is transferred to a library cell modifying unit 430. The library cell modifying unit 430 modifies the library cells on the list of library cells 540 selected to form a list of modified library cells 550. Each one of the modified library cells in the list of modified library cells 550 corresponds to a library cell on the list of library cells 540. In at least one embodiment, each of the modified library cells in the list of modified library cells 550 has an identical function to the corresponding library cell in the list of library cells 540, but the dimensions of the features in each of the modified cells are modified to reduce overall power consumption of the semiconductor chip being designed. In some embodiments, each of the modified cells has the same external dimensions as the corresponding library cell. In other embodiments, any features that are touching an edge of the modified cell in which those features are contained, have identical positions and dimensions at the edge of the modified cell as corresponding features in the corresponding library cell. The above constraints on the modified library cell mean that the modified library cell replaces a corresponding library cell without the need to modify any cells surrounding the replaced cell. FIG. 5(a) depicts a library cell for a semiconductor device 600 and FIG. 5(b) depicts a corresponding modified library cell for a semiconductor device 610. In at least one embodiment, the differences between the library cell 600 and the corresponding modified library cell 610 are the gate widths and channel widths W3 and W4.

The list of modified library cells 550 from the library cell modifying unit 430 and the list of cells in the design that implement non-critical paths 530 from the cell determination unit 420 are transferred to a cell replacement unit 440. The cell replacement unit 440 replaces the library cell that cells on the list of cells in the layout 505 that implement non-critical paths 530 use with a corresponding modified library cell from the list of modified library cells 550. The cell replacement unit 440 then outputs a complete modified layout 560 of the semiconductor chip.

Figure 6:
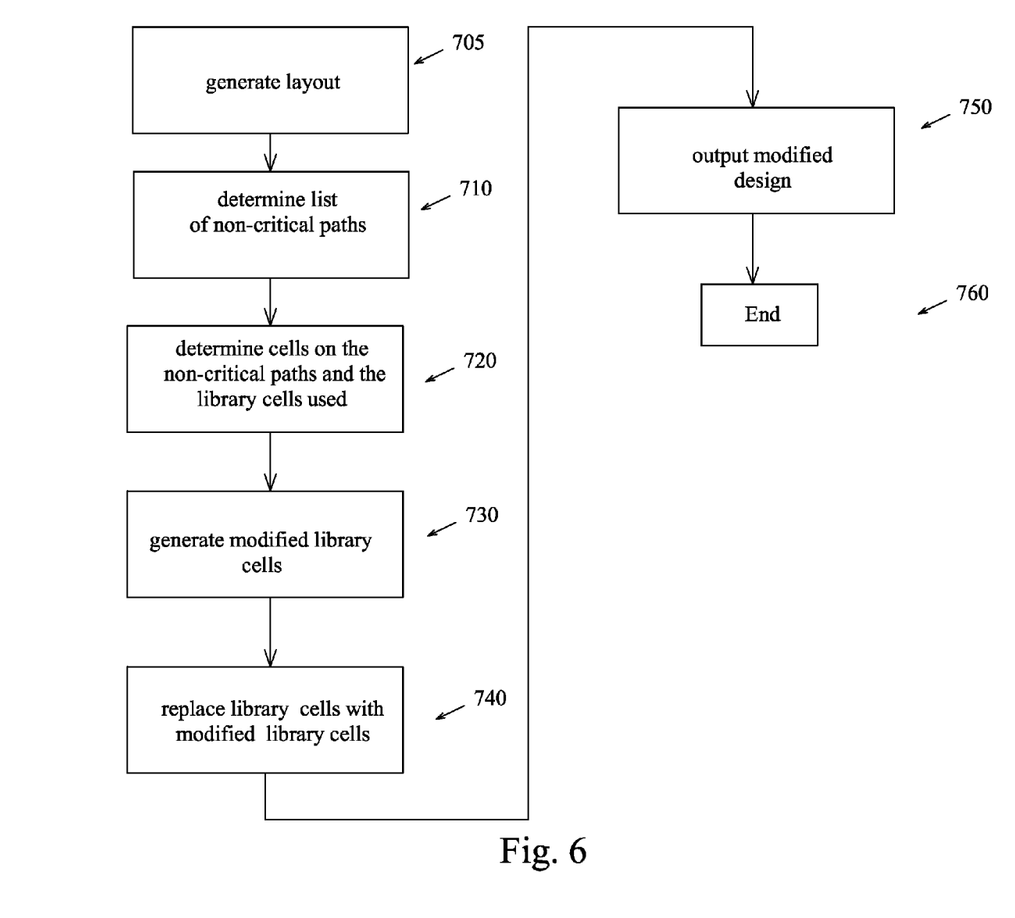
FIG. 6 is a flow chart of a method of laying out a low power semiconductor chip according to an embodiment.

FIG. 6 depicts a flow chart of at least a portion of a method 700 of designing reduced power consumption semiconductor chips according to an embodiment.

In some embodiments, the method begins at step 705. At step 705, a layout 505 is generated based on an input 510 as described above. After the layout 505 is generated, the method passes to step 710

At step 710, a list of the non-critical paths in the design 520 is determined based on the layout 505 and the input 510. After the non-critical paths in the design are determined, the method passes to step 720.

At step 720, the cell determination unit 420 determines a list of cells in the design that implement the non-critical paths 530, based on the determined non-critical paths 520. At the same time, a list of library cells 540 used to implement each one of those cells that implement non-critical paths is determined. In some embodiments, all of the library cells identified are included on the list. In other embodiments, only a portion of the library cells identified are included on the list. In some embodiments, the library cells included in the list of library cells 540 are selected based on complexity with more complex cells being excluded; in other embodiments, the library cells included in the list of library cells 540 are selected based on the function of the library cell. Next, the method proceeds to step 730.

At step 730, the library cells on the list of library cells 540 selected are modified to form a list of modified library cells 550. The modified library cells in the list of modified library cells 550 correspond to one of the library cells on the list of library cells 540. In at least some embodiments, each of the modified library cells in the list of modified library cells 550 has an identical function to the corresponding library cell in the list of library cells 540, but the dimensions of the features in each of the modified cells are modified to reduce overall power consumption of the semiconductor chip being designed. In some embodiments, each of the modified cells has the same external dimensions as the corresponding library cell. In other embodiments, features touching an edge of the modified cell containing those features have identical positions and dimensions at the edge of the modified cell as corresponding features in the corresponding library cell. The above constraints on the modified library cell mean that the modified library cell can replace a corresponding library cell without the need to modify any cells surrounding the replaced cell. After the list of the list of modified library cells 550 is compiled, the method proceeds to step 740.

At step 740, the library cell for cells on the list of cells in the layout 505 that implement non-critical paths 530 are replaced with a corresponding modified library cell from the list of modified library cells 550. The method then proceeds to step 750.

At step 750, a modified layout 560 of the semiconductor chip is output. The method then terminates at step 760.

The method depicted in FIG. 6 is simplified for the clarity of the disclosure. A person of ordinary skill in the art will appreciate that, in some embodiments, one or more steps or processes are performed before, after, or in between the method depicted in FIG. 6.

Figure 7:
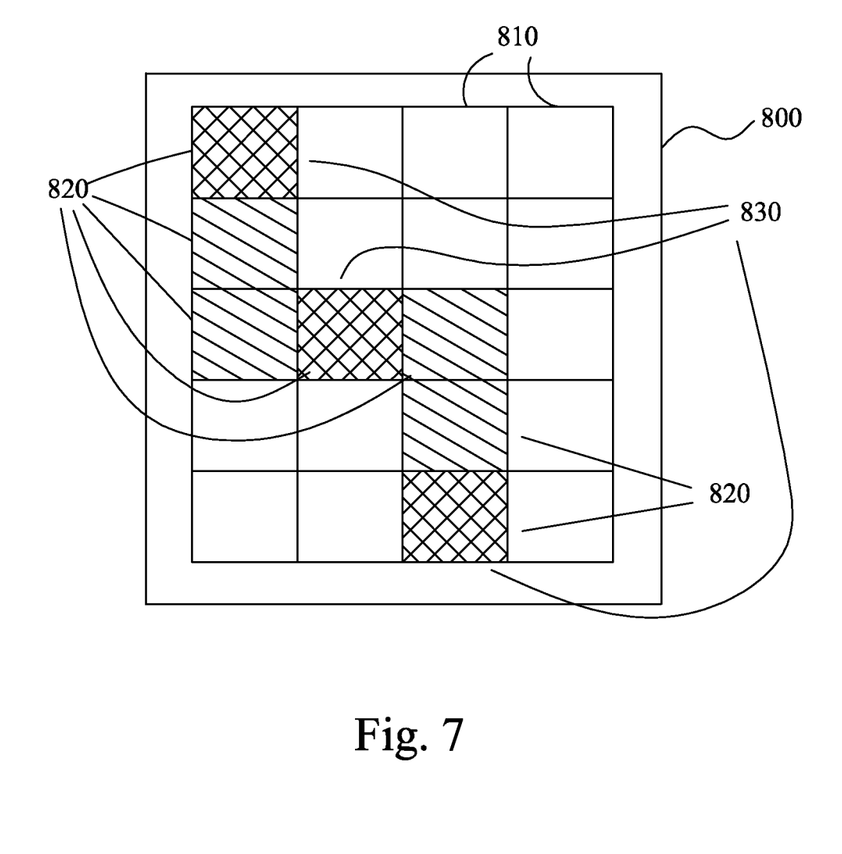
FIG. 7 is a low power semiconductor chip according to an embodiment.

FIG. 7 depicts an embodiment of a low power semiconductor chip 800 laid out by embodiments of the method or systems, as described above.

The low power semiconductor chip 800 comprises a plurality of cells 810 with the plurality of cells being either a library cell or a modified library cell, as described above. Cells 820 of the plurality of cells correspond to cells identified as being on a critical path. Cells 830 correspond to cells where the library cell has been replaced by a modified library cell due to being on a non-critical path.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A layout system comprising:
 a layout unit configured to layout cells in a mask design for a semiconductor chip based on library cells for a specified process node;
 a non-critical path determination unit configured to determine a non-critical path in the semiconductor chip;
 a cell determination unit configured to determine a group of cells in the mask design that form a part of the non-critical path and determine a corresponding library cell for at least one of the group of cells;
 a library cell modifying unit configured to modify one or more corresponding library cells to form a corresponding modified library cell, the modified library cell comprises a reduced gate width with respect to the corresponding library cell, wherein the library cell modifying unit is configured to maintain features touching an edge of the corresponding library cell; and
 a cell replacement unit configured to replace a library cell in the group of cells in the mask design that form a part of the non-critical path with the corresponding modified library cell.

2. The system of claim 1, corresponding modified cells being configured to reduce the power dissipated by the semiconductor chip.

3. The system of claim 1, wherein the modified library cell further comprises a reduced wiring width with respect to the corresponding library cell.

4. The system of claim 1, the corresponding library cell and the corresponding modified library cell being the same size.

5. The system of claim 4, the corresponding library cell and the corresponding modified library cell being identical along a portion of the corresponding library cell that corresponds to the corresponding library cell boundary.

6. The system of claim 1, wherein the cell determination unit is configured to determine the corresponding library cell from the group of cells based on a function of the corresponding library cell.

7. The system of claim 1, wherein the cell replacement unit is configured to replace the library cell with the corresponding modified library cell without modifying cells surrounding the corresponding modified library cell.

8. A method of laying out a semiconductor chip comprising:
 laying out cells, using a computer, in a mask design for the semiconductor chip base on library cells for a specified process node;
 determining a non-critical path in the semiconductor chip;
 determining a group of cells in the mask design that form a part of the non-critical path and determining a corresponding library cell for at least one of the cells in the group;
 modifying the corresponding library cell to form a corresponding modified library cell, wherein the modified library cell comprises a reduced gate width with respect to the corresponding library cell, wherein modifying the corresponding library cells comprises maintaining features touching an edge of the corresponding library cell; and
 replacing the library cell for at least one of the cells in the group with the corresponding modified library cell.

9. The method of claim 8, wherein modifying comprises modifying the corresponding library cell to reduce the power dissipated by the semiconductor chip.

10. The method of claim 8, wherein the modified library cell comprises a reduced wiring width with respect to the corresponding library cell.

11. The method of claim 8, wherein the corresponding library cell and the corresponding modified library cell are the same size.

12. The method of claim 11, wherein the corresponding library cell and the corresponding modified library cell are identical along a portion of the corresponding library cell that corresponds to the corresponding library cell boundary.

13. A memory or a non-transitory computer-readable medium storing instructions which, when executed by a processor, cause the processor to perform the method of claim 8.

14. The method of claim 8, wherein determining the corresponding library cell comprises selecting the corresponding sell from the group of cells based on a function of the corresponding library cell.

15. The method of claim 8, wherein replacing the library cell with the corresponding modified library cell is performed without modifying cells surrounding the corresponding modified library cell.

16. A semiconductor chip comprising:
 a plurality of semiconductor devices arranged in cells,
 wherein cells that form a portion of a critical path in the semiconductor chip correspond to a cell of a library of cells for a specified process node, and
 cells that form a portion of a non-critical path in the semiconductor chip correspond to cells of the library of cells for the specified process node that are modified to reduce power consumption of the semiconductor chip,
 wherein each modified library cell is formed by reducing a gate width of a feature of the corresponding library cell, and
 each modified library cell has a same features touching an edge of the modified library cell as corresponding cells of the library of cells.

17. The semiconductor chip of claim 16, wherein each modified library cell is formed by reducing a wiring width of a feature of the corresponding library cell.

18. The semiconductor chip of claim 16, wherein each modified library cell and the corresponding library cell are identical along a portion of the corresponding library cell that corresponds to a boundary of the corresponding library cell.

19. The semiconductor chip of claim 16, wherein the corresponding library cell and the corresponding modified library cell are the same size.

20. The semiconductor chip of claim 16, wherein cells surrounding the modified library cell correspond to cells of a library cell without modification.

* * * * *